(12) United States Patent
Akhavan et al.

(10) Patent No.: US 9,960,940 B2
(45) Date of Patent: May 1, 2018

(54) FREQUENCY SHAPING AND ADAPTIVE ROUNDING FOR O-QPSK AND MSK TRANSMISSION IN POLAR COORDINATES

(71) Applicant: QUALCOMM Incorporated, San Diego, CA (US)

(72) Inventors: Koorosh Akhavan, San Diego, CA (US); Eunmo Kang, San Diego, CA (US); Rajapaksa Senaratne, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/255,659

(22) Filed: Sep. 2, 2016

(65) Prior Publication Data
US 2017/0288921 A1    Oct. 5, 2017

Related U.S. Application Data

(60) Provisional application No. 62/314,943, filed on Mar. 29, 2016.

(51) Int. Cl.
*H04L 27/20* (2006.01)
*H04B 1/04* (2006.01)
(Continued)

(52) U.S. Cl.
CPC ............ *H04L 27/20* (2013.01); *H04B 1/0017* (2013.01); *H04B 1/0475* (2013.01);
(Continued)

(58) Field of Classification Search
USPC ................. 375/308, 130, 295, 350
See application file for complete search history.

(56) References Cited

U.S. PATENT DOCUMENTS 6,421,396 B1 * 7/2002 Hawley ................. H04L 27/362
  332/103
6,778,586 B1 * 8/2004 Mano ..................... H04B 1/707
  375/130

(Continued)

FOREIGN PATENT DOCUMENTS

WO       0141381 A2    6/2001

OTHER PUBLICATIONS

Lohmeier; Adaptive FIR Filtering of Range Sidelobes for Air and Spaceborne Rain Mapping; IEEE 2002.*
(Continued)

*Primary Examiner* — Eva Puente
(74) *Attorney, Agent, or Firm* — Muncy, Geissler, Olds, Lowe, P.C./Qualcomm

(57) ABSTRACT

Systems and methods are directed to phase modulation of polar coordinates in a transmitter of wireless signals, to achieve high transmit power levels while meeting spectral mask and EVM requirements. An input signal is mapped to a sequence of modulation frequency (e.g., O-QPSK to MSK) to generate a mapped signal. A digital frequency shaping filter is applied to the mapped signal to generate a shaped signal. An adaptive rounding algorithm is applied to the shaped signal to generate a reduced bit-width signal. A digital frequency synthesizer is applied to the reduced bit-width signal to generate an analog waveform for transmission.

18 Claims, 13 Drawing Sheets

(51) Int. Cl.
    *H04L 25/03*     (2006.01)
    *H04B 1/00*     (2006.01)
    *H04L 27/12*     (2006.01)

(52) U.S. Cl.
    CPC .. *H04L 25/03828* (2013.01); *H04L 25/03834* (2013.01); *H04L 25/03853* (2013.01); *H04L 25/03859* (2013.01); *H04L 27/122* (2013.01); *H04B 2001/0491* (2013.01)

(56) References Cited

U.S. PATENT DOCUMENTS

| | | | |
|---|---|---|---|
| 7,176,821 B1* | 2/2007 | Williams, III | H03M 7/3015 |
| | | | 341/118 |
| 8,150,324 B2 | 4/2012 | Jelonnek et al. | |
| 8,275,319 B2 | 9/2012 | Dakshinamurthy et al. | |
| 8,531,244 B2 | 9/2013 | Shibata et al. | |
| 2004/0223558 A1 | 11/2004 | Brown et al. | |
| 2008/0043889 A1* | 2/2008 | Menkhoff | H03H 17/0275 |
| | | | 375/350 |
| 2011/0075050 A1 | 3/2011 | Ahluwalia et al. | |
| 2011/0164702 A1* | 7/2011 | Pavlovic | H04L 27/361 |
| | | | 375/295 |

OTHER PUBLICATIONS

Rahman M., et al., "An IEEE 802.15.6 Standard Compliant 2.5 nJ/Bit Multiband WBAN Transmitter Using Phase Multiplexing and Injection Locking," IEEE Journal of Solid-State Circuits, May 2015, vol. 50 (5), pp. 1126-1136.
A Technical Tutorial on Digital Signal Synthesis, Analog Devices Inc., Norwod, MA Copyright 1999, 122 pages.
International Search Report and Written Opinion—PCT/US2017/023554—ISA/EPO—dated Jun. 29, 2017.
Pamarti S., "Digital Techniques for Integrated Frequency Synthesizers: A tutorial", IEEE Communications Magazine, vol. 47, No. 4, Apr. 1, 2009, pp. 126-133.

* cited by examiner

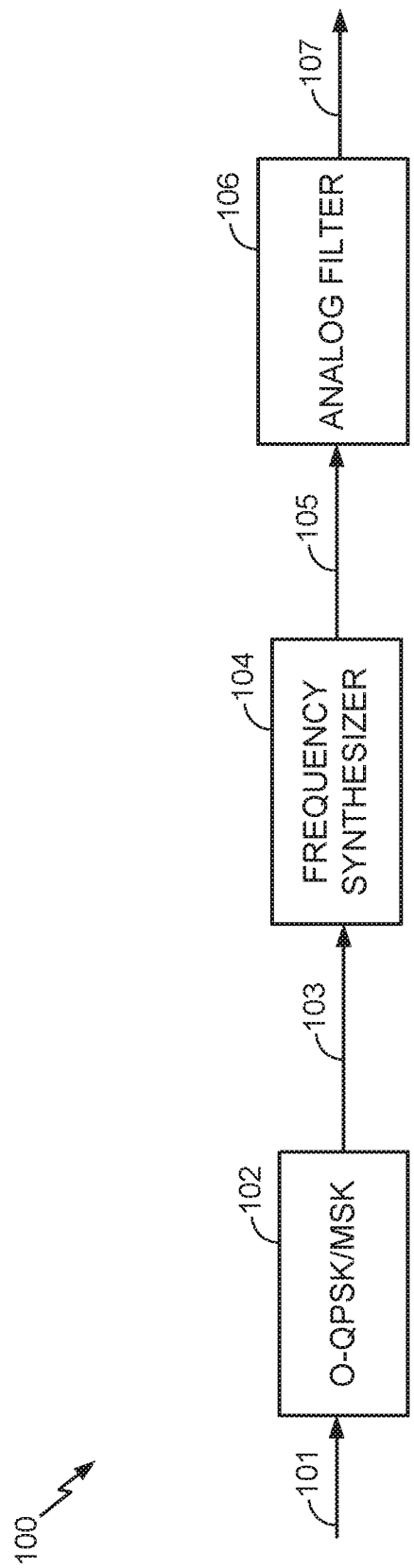
FIG. 1
CONVENTIONAL

FREQUENCY SHAPING AND ADAPTIVE ROUNDING FOR O-QPSK AND MSK TRANSMISSION IN POLAR COORDINATES

CROSS-REFERENCE TO RELATED APPLICATIONS

The present Application for Patent claims the benefit of Provisional Patent Application No. 62/314,943 entitled "FREQUENCY SHAPING AND ADAPTIVE ROUNDING FOR O-QPSK AND MSK TRANSMISSION IN POLAR COORDINATES" filed Mar. 29, 2016, and assigned to the assignee hereof and hereby expressly incorporated herein by reference in its entirety.

FIELD OF DISCLOSURE

Disclosed aspects relate to a transmitter of wireless signals. More specifically, exemplary aspects are directed to frequency shaping and adaptive rounding for transmission of offset-quadrature phase shift keying (O-QPSK) and minimum-shift keying (MSK) modulated signals in polar coordinates.

BACKGROUND

Wireless communication systems may include transmitters and receivers (or combinations thereof) of wireless signals. In the case of transmission of the wireless signals, a transmitter may modulate data signals to be transmitted on to a carrier wave and a receiver may receive the modulated signals and demodulate the data signals. Various types of modulation techniques are known in the art, such as phase modulation, amplitude modulation, etc. In this disclosure, phase modulation is considered in more detail.

Phase modulation refers to a type of modulation where data signals (or information) are digitally encoded as variations in an instantaneous phase of the carrier wave. In the context of digital signal transmission, phase modulation is seen to switch between different phases. Thus, phase modulation is generally referred to as phase shift keying (PSK). Numerous types of PSK are known in the art, such as, quadrature PSK (QPSK), offset-QPSK (O-QPSK), binary PSK (BPSK), minimum-shift keying (MSK), etc. It is possible to switch between different types of PSK.

For example, considering a time-domain implementation of a QPSK modulator, an input bit stream of the data signals to be transmitted is split into in-phase (I) and quadrature (Q) waveforms, which are then separately modulated by two carriers which are in phase quadrature (e.g., a sine and a cosine carrier wave which are varied in phase, while keeping amplitude and frequency constant). This allows transmission of two bits in each modulation symbol, with four possible different symbols since the phase of the carrier wave can take on four possible values (e.g., 0, $\pi/2$, $\pi$, $3\pi/2$), wherein each phase corresponds to a different symbol. It is seen that each modulated signal in QPSK can be represented as a BPSK signal and summed up to produce the QPSK signal. In another example, while it is possible to generate an O-QPSK waveform in a similar manner as described above for QPSK, by generating the I and Q waveforms separately using I and Q modulators, in the time-domain, O-QPSK modulation can also be achieved by generating time-domain baseband I and Q waveforms according to QPSK signaling followed by using half-sine (HS) shaping filters, and shifting the Q waveform by half a symbol period with respect to the I waveform. As yet another example, an MSK modulator can be implemented by recognizing that the difference between O-QPSK and MSK lies in the way the input bits are mapped.

Accordingly it is seen that for various types of PSK signaling in time-domain, a transmitter can be implemented using I and Q modulators. Doing so makes it possible for the modulated signals to satisfy a "spectral mask", which defines a power spectrum according to wireless communication standards or regulations. For example, the spectral mask may be satisfied by implementing a pair of digital low-pass filters designed to suppress side-lobes of the I and Q modulated signals in their signal power spectrum. In time-domain, finding filter coefficients that achieve both satisfactory side-lobe suppression and satisfactory error vector magnitude (EVM) is relatively straightforward, and therefore, transmitters which implement time-domain PSK signaling can be designed to meet the spectral mask and EVM using conventional approaches known in the art.

With the exploration of low-cost RF communication (e.g., WiFi, Bluetooth, Bluetooth Low Energy (BLE), etc.) seen in recent times, for example, in emerging markets such as Internet-of-Things (IoT), frequency-domain PSK signaling is recognized as a better alternative to time-domain PSK signaling, since implementations of transmitters using frequency-domain signaling can incur less costs in comparison to transmitters using time-domain signaling.

For example, O-QPSK and MSK signals can also be generated using a frequency synthesizer, rather than the separate I and Q modulators as discussed above in the time-domain. In the frequency-domain, O-QPSK and MSK modulation can involve mapping the data signals or information bits to corresponding waveforms in the frequency domain and feeding the mapped symbols to a frequency synthesizer which generates a frequency modulated (FM) signal. A modulator using the frequency synthesizer can be designed with less area and can consume less power in comparison to the I and Q modulators. However, unlike the straightforward case of I and Q modulators in the time-domain, the spectral mask and EVM requirements in the frequency domain are more difficult to satisfy, as these metrics are related to standards specified for the low-cost applications discussed above (e.g., the well-known IEEE 802.15.4 standard). At high transmit power levels (which can be desirable in many scenarios in this application space), conventional frequency-domain implementations of O-QPSK and MSK modulation, for example, with analog frequency synthesizers, are seen to violate or exceed the specified spectral mask in an attempt to meet the EVM requirements.

Thus, there is recognized a need in the art for designs of transmitters in the frequency domain which can meet spectral mask and EVM requirements for various modulation schemes such as O-QPSK or MSK in the frequency domain, while retaining the desirable characteristics of low cost and low power.

SUMMARY

The following presents a simplified summary relating to one or more aspects disclosed herein. Example systems and methods are directed to phase modulation of polar coordinates in a transmitter of wireless signals, to achieve high transmit power levels while meeting spectral mask and EVM requirements. An input signal is mapped to a sequence of modulation frequency (e.g., O-QPSK to MSK) to generate a mapped signal. A digital frequency shaping filter is applied to the mapped signal to generate a shaped signal. An adaptive rounding algorithm is applied to the shaped signal to generate a reduced bit-width signal. A digital frequency synthesizer is applied to the reduced bit-width signal to generate an analog waveform for transmission.

For example, an exemplary aspect is directed to a method for generating phase modulated signals in polar coordinates for transmission in a transmitter of wireless signals, the method comprising mapping an input signal to a sequence at modulation frequency to generate a mapped signal, applying a digital frequency shaping filter to the mapped signal to generate a shaped signal, applying an adaptive rounding algorithm to the shaped signal to generate a reduced bit-width signal; and applying a digital frequency synthesizer to the reduced bit-width signal to generate an analog waveform for transmission.

Another exemplary aspect is directed to a transmitter of wireless signals, comprising a mapping block configured to map an input signal in polar coordinates to a sequence at modulation frequency to generate a mapped signal, a digital frequency shaping filter configured to shape the frequency of the mapped signal to generate a shaped signal, an adaptive rounding block configured to perform adaptive rounding of the shaped signal to generate a reduced bit-width signal, and a digital frequency synthesizer configured to generate an analog waveform for transmission from the reduced bit-width signal.

Another exemplary aspect is directed to an apparatus configured for transmission of wireless signals, the apparatus comprising means for mapping an input signal in polar coordinates to a sequence at modulation frequency to generate a mapped signal, means for digital shaping the frequency of the mapped signal to generate a shaped signal, means for adaptively rounding the shaped signal to generate a reduced bit-width signal, and means for generating an analog waveform for transmission from the reduced bit-width signal.

Yet another exemplary aspect is directed to a non-transitory computer readable storage medium comprising code, which, when executed by a processor, causes the processor to perform operations for generating phase modulated signals in polar coordinates for transmission of wireless signals, the non-transitory computer readable storage medium comprising code for mapping an input signal to a sequence at modulation frequency to generate a mapped signal, code for applying a digital frequency shaping filter to the mapped signal to generate a shaped signal, code for applying an adaptive rounding algorithm to the shaped signal to generate a reduced bit-width signal, and code for applying a digital frequency synthesizer to the reduced bit-width signal to generate an analog waveform for transmission.

BRIEF DESCRIPTION OF THE DRAWINGS

The accompanying drawings are presented to aid in the description of aspects of the invention and are provided solely for illustration of the aspects and not limitation thereof.

FIG. 1 illustrates a conventional transmitter system for transmission of polar coordinates.

DETAILED DESCRIPTION

Figure 2:
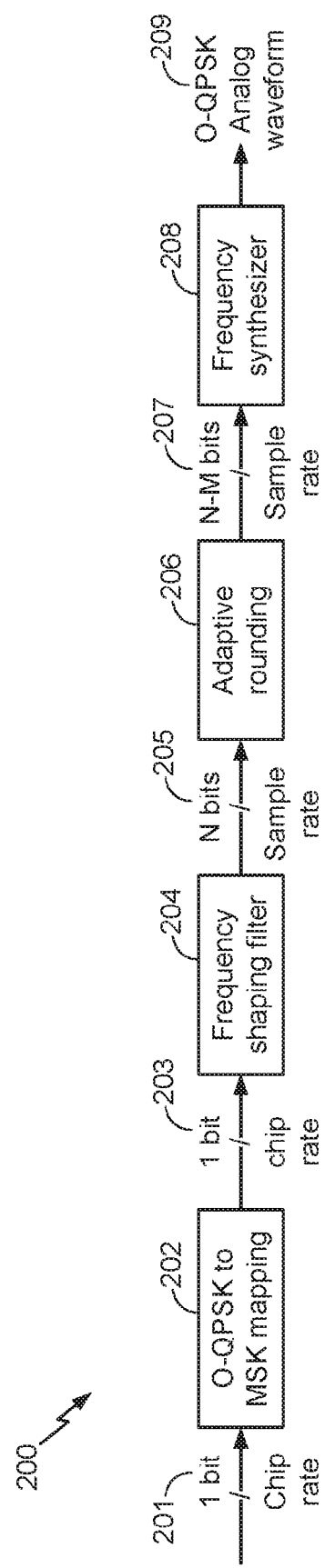
FIG. 2 an exemplary transmitter system for transmission of polar coordinates.

Various aspects are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter.

Exemplary aspects of this disclosure are directed to transmitters of wireless signals, configured to satisfy spectral mask and EVM requirements for phase modulated signals. For example, exemplary transmitters are designed to generate phase modulated symbols such as O-QPSK or MSK signals, (e.g., as specified in standards such as IEEE 802.15.4 PHY) in frequency-domain (or "polar coordinates") and for high transmit power levels with analog frequency synthesizers. Accordingly, aspects of an exemplary transmitter design comprise a discrete-time or digital frequency shaping filter and an adaptive rounding algorithm, as further explained below.

The frequency shaping filter is configured to lower or suppress the signal side-lobes in frequency while maintaining the EVM at a low level, wherein the frequency shaping filter can be implemented as a polyphase filter with low hardware costs in some examples.

The adaptive rounding algorithm, which can be implemented in an adaptive rounding block, for example, is configured to prevent the input frequency to the analog frequency synthesizer from having bias, since such a bias would only have been introduced after quantizing the frequency shaping filter output to the frequency synthesizer input bit width. The adaptive rounding algorithm is also configured to prevent the phase of the modulated signal from drifting in an unbounded manner, wherein it is noted that if the phase drift is left unchecked, it can lead to large, unbounded growth in EVM.

Accordingly, the combination of the digital frequency shaping filter and the adaptive rounding algorithm can ensure that the spectral mask is satisfied while meeting the EVM requirements.

It will be understood that although O-QPSK or MSK schemes may be discussed herein as representative phase modulation schemes in exemplary aspects, the disclosure is not limited to these schemes. As such the scope of exemplary aspects can be easily extended to any other suitable modulation scheme based on this disclosure.

With reference to FIG. 1, a conventional implementation of phase modulation in polar coordinates will first be discussed. Illustrated in FIG. 1 are aspects of a phase modulator in transmitter 100 of wireless signals (e.g., a transmitter of RF signals according to IEEE 802.15.4 O-QPSK PHY). Block 102 receives a data stream of input signals 101 and applies phase modulation techniques such as O-QPSK or MSK in the frequency-domain or polar coordinates, to generate output 103 comprising mapped symbols according to the PSK scheme applied in block 102. Output 103 is supplied to frequency synthesizer 104 to generate frequency modulated (FM) signal 105. As previously discussed, FM signal 105 may violate the spectral mask for the applicable standards governing transmission of wireless signals by transmitter 100. It is recognized that FM signal 105 is an analog signal, and so analog filter 106 is applied to FM signal 105, e.g., for side-lobe suppression in FM signal 105, in an effort to meet the spectral mask. However, analog filter 106 is expensive, since it implements analog components, and correspondingly, also consumes significant area and power. Furthermore, the implementation of analog filter 106 is not easily scalable and so may be unsuitable for high transmit power of frequency shaped signal 107 generated at the output of analog filter 106.

With reference now to FIG. 2, exemplary transmitter 200 is illustrated, wherein transmitter 200 is configured with exemplary phase modulation techniques. Transmitter 200, as will be further explained below, can be configured to ensure that EVM requirements are met while also meeting spectral mask specifications even at high transmit power levels while applying phase modulation in polar coordinates. In exemplary aspects, transmitter 200 avoids the need for an analog filter such as analog filter 106 of FIG. 1. In exemplary aspects, transmitter 200 implements a digital frequency shaping filter and an adaptive rounding algorithm as discussed below.

Referring to FIG. 2, input signal 201 is received by transmitter 200. Input signal 201 may comprise a data stream. Since multiple symbols may be transmitted per data bit, based on the type of PSK applied, the multiple symbols per data bit are referred to as "chips", such that the symbol rate of input signal 201 is referred to as a chip rate. As shown, input signal 201 may have a chip rate of 1 bit, but this is merely exemplary and not a limitation. In block 202, a chosen PSK is applied to map input signal 201 to the phase-modulated output 203. Although block 202 can be designed for a specific type of PSK, it is possible to interchange or map between the different PSK algorithms. This is explained for the case of O-QPSK to MSK mapping with a brief departure from FIG. 2 to FIG. 3.

Figure 3:
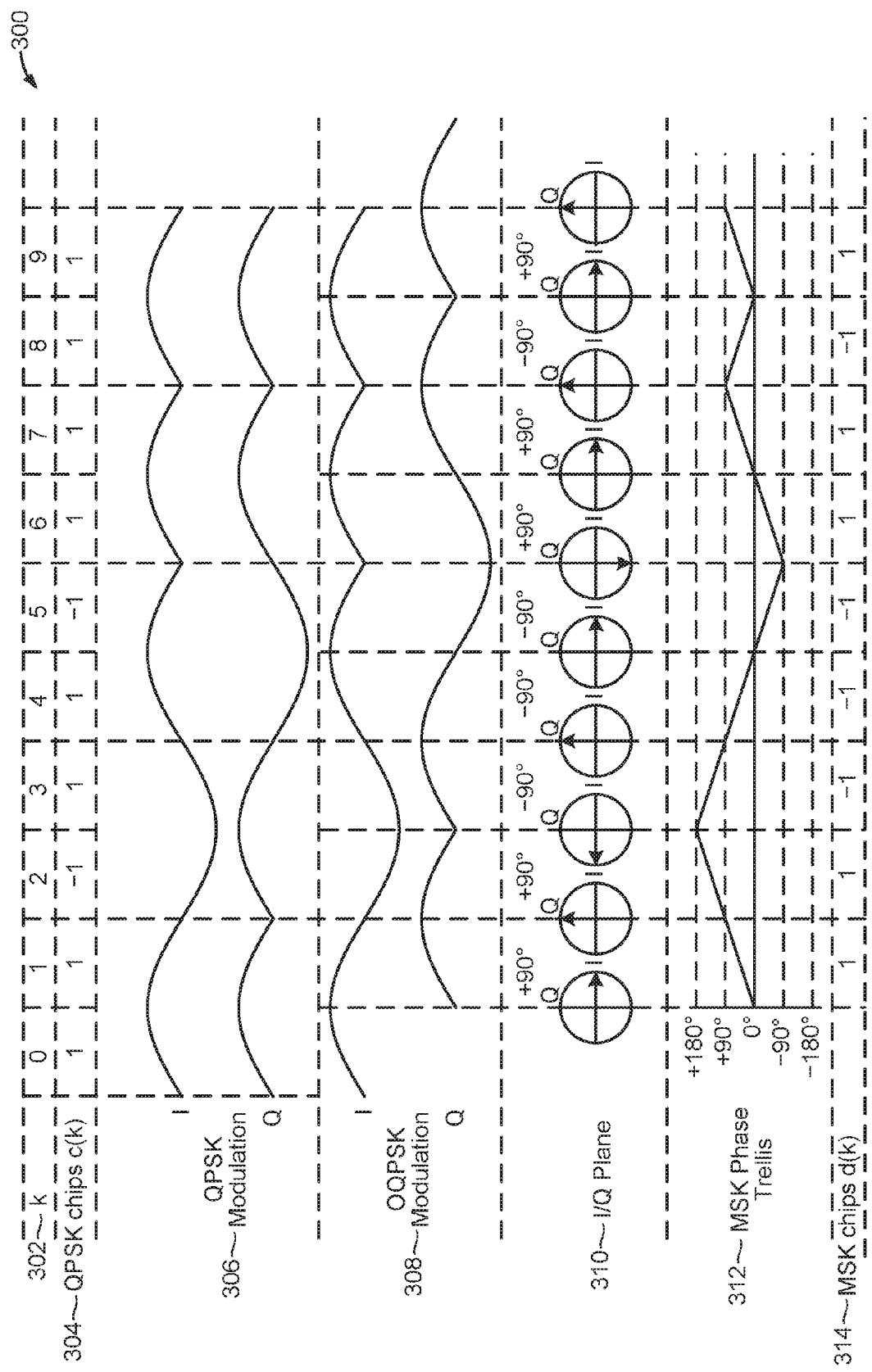
FIG. 3 illustrates waveforms for various phase modulation techniques.

Referring to FIG. 3, table 300 is shown to illustrate that QPSK/O-QPSK chips can be mapped to MSK chips. Specifically, waveforms 306, 308, 310, and 312 are shown in the time-domain. For example, waveform 310 shows phase relations for I and Q streams for an example input signal in time-domain. Waveform 306 shows QPSK modulated I and Q streams corresponding to waveform 310. Waveform 308 shows how the O-QPSK waveform is obtained by shifting the Q waveform of waveform 306 by half a symbol period with respect to the I waveform. Waveform 312 illustrates an MSK phase trellis corresponding to waveform 310.

With continuing reference to FIG. 3, rows 302, 304, and 314 show example mappings in the frequency-domain. For example, row 302 provides a serial number and row 304 shows QPSK chips c(k) (which map to waveform 306) corresponding to the serial numbers in row 302. MSK chips d(k) are shown in row 314, wherein it is observed that the serial numbers of row 302 corresponding to MSK chips in 314 can be easily obtained by shifting the QPSK chips of row 304 by one symbol period, which, incidentally also corresponds to O-QPSK chips (not shown) based on the above explanation.

Thus, returning to FIG. 2, it is seen that if block 202 is designed for MSK, then QPSK or O-QPSK chips can be easily mapped to the MSK chips. Accordingly, an illustrative description of exemplary features will be provided with MSK mapping applied in block 202, keeping in mind that any other type of PSK can be equally applicable to the exemplary aspects, based on straightforward mapping between the different types of phase modulation. Accordingly, with MSK mapping considered in an example, without loss of generality, block 202 performs MSK mapping on input signal 201 to generate mapped signal 203. Mapped signal 203 is also a digital signal, which has the same chip rate of input signal 201 (i.e., a chip rate of 1 bit in this example). Rather than feed mapped signal 203 to a frequency synthesizer (as in the conventional case discussed with reference to FIG. 1), in exemplary transmitter 200, mapped signal 203 is provided to a digital frequency shaping filter 204.

Frequency shaping filter 204 is designed to help suppress side-lobes. In general, suppression of side-lobes may lead to an increase in EVM. Therefore, frequency shaping filter 204 is designed to ensure that EVM does not significantly increase. Furthermore, frequency shaping filter 204 causes a quantized input to be provided to frequency synthesizer 208. Quantization of the input to frequency synthesizer 208 may also lead to an increase in EVM (referred to herein, as the "quantization effect"). To avoid an increase in EVM due to the quantization effect, the aforementioned adaptive rounding algorithm is implemented in adaptive rounding block 206, which will be discussed in further detail in the following sections.

Example implementations of frequency shaping filter 204 will be discussed with relation to FIGS. 4A-E in the following sections. The functionality of frequency shaping filter 204 will now be discussed in more detail.

Considering, for the sake of explanation, specifications of an example standard such as the IEEE 802.15.4 PHY (hereafter "the standard") are considered. When operating in the industrial, scientific and medical (ISM) 2450 MHz radio band, the standard defines that signal transmission should conform to the table identified as Table 1 below:

TABLE 1

IEEE spectral mask requirements

| Frequency | Relative limit | Absolute limit |
|---|---|---|
| $\|f - f_c\| > 3.5$ MHz | −20 dB | −30 dBm |

From Table 1 (and keeping in mind that for both relative and absolute limits, the average spectral power is to be measured using a 100 KHz resolution bandwidth) for the relative limit, the reference level is specified to be the highest average spectral power measured within ±1 MHz of the carrier frequency.

Accordingly, for O-QPSK, the O-QPSK power spectral density is provided by $$\Phi_{XX}(f) = \frac{G}{2\pi^2}\left(\frac{\cos(\pi f T_s)}{(f T_s)^2 - \frac{1}{4}}\right)^2 [W/Hz],$$

where $T_s=1$ μs.

As explained previously, it is desirable for transmitter 200 to transmit signals at high transmit power levels, e.g., above the relative limit of 20 dBm. Thus, considering a transmit power of 21 dBm, as an example of a transmit power to achieve, and setting $G=1.2978\times10^{-7}$, with 100 KHz resolution bandwidth (RBW), the following equations are reached for transmit power levels "P" below:

$P=+21.1$ dBm(100%), $|f-f_c|<20$ MHz $P=+21.0$ dBm(97.0%), $|f-f_c|<1.0$ MHz $P=-12.9$ dBm(0.04%), $|f-f_c|>3.5$ MHz

As seen, these transmit power levels do not meet the requirements for the absolute power limit shown in Table 1, i.e., −30 dBm, for frequencies beyond 3.5 MHz, as per the standard. In addition, the Federal Communications Commission (FCC) requirement for the absolute power limit for the top of the ISM band is −41 dBm/MHz for frequency ranges between 2483.5 MHz to 2500 MHz. Thus, even if the last channel, (i.e., channel 26 at the 2480 MHz band) is not used for transmission, the previous channel (i.e., the channel at 2475 MHz band) should be able to meet the absolute power limit requirement. This means that at least 17 dB of side-lobe suppression is needed to meet the spectral mask defined in the standard, and even more suppression to meet the FCC requirement. Furthermore, spectral regrowth due to nonlinear phase amplification (PA) also needs to be accounted for. To satisfy these various requirements, frequency shaping filter 204 is designed to implement shaping via a frequency deviation (fdev) waveform for MSK.

To meet the mask requirement the MSK fdev waveform, which is the time derivative of the MSK phase trellis shown in row 312 of FIG. 3, is assumed to be an ideal pulse train. Frequency shaping filter 204 can thus be configured to shape the fdev waveform, by implementing, for example, a filter which can reduce the power spectral density (PSD) side-lobe level. Incidentally, this would also enable reduction by about 35% in the EVM, from the EVM defined as acceptable in the standard.

As previously mentioned, the error-vector magnitude (EVM) determines the modulation accuracy of the transmitter. To calculate the EVM a time record of N received complex chip values $(\overline{I}_j, \overline{Q}_j)$ is captured. The error vector is the distance from the ideal position to the actual position, represented by the equation $(\overline{I}_j, \overline{Q}_j)=(I_j, Q_j)+(\delta I_j, \delta Q_j)$. The EVM is correspondingly defined as $$EVM \triangleq \sqrt{\frac{\frac{1}{N}\sum_{j=1}^{N}(\delta I_j^2 + \delta Q_j^2)}{\frac{1}{N}\sum_{j=1}^{N}(I_j^2 + Q_j^2)}}$$

Figure 4A:
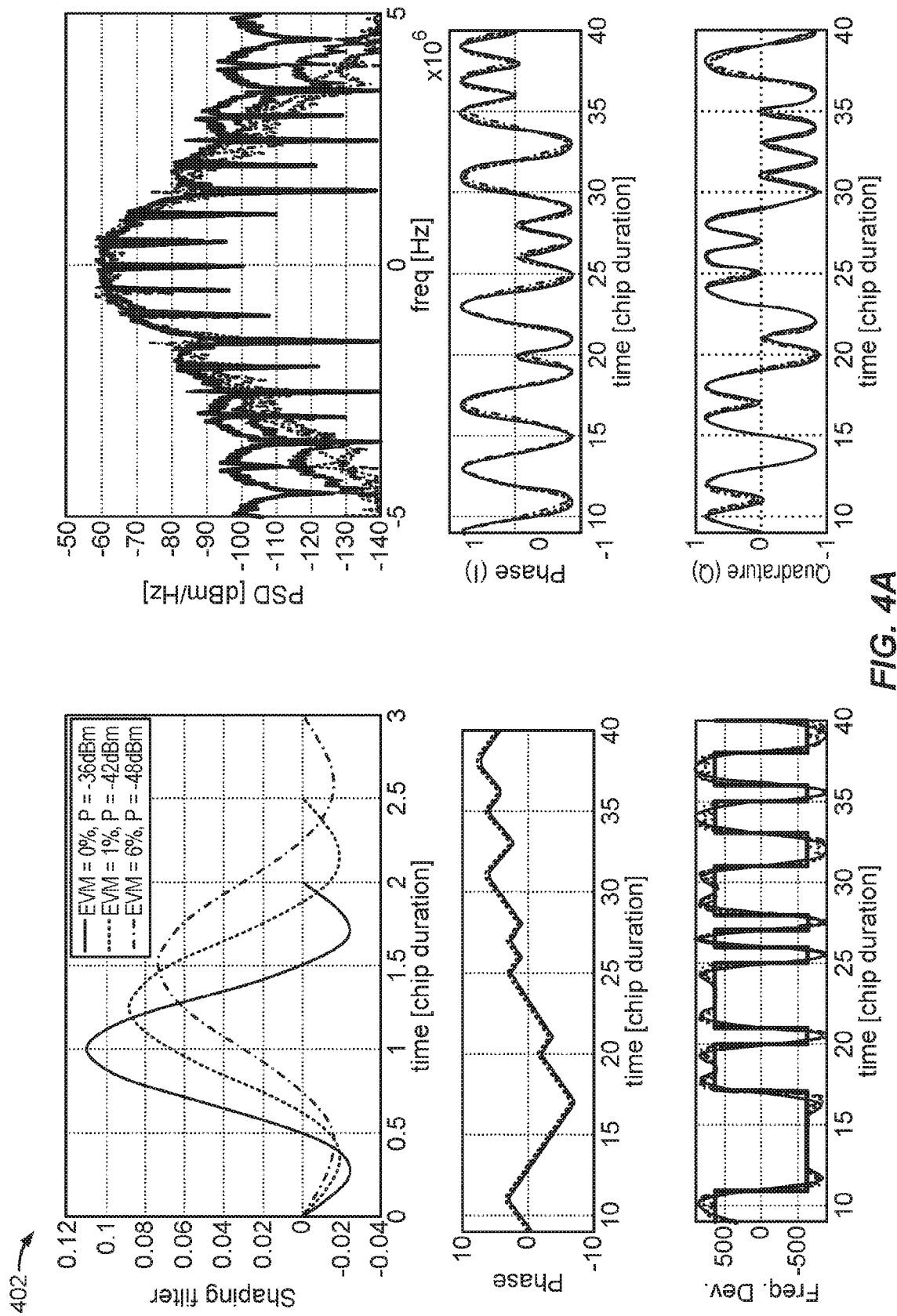
FIGS. 4A-E illustrate aspects of digital frequency shaping filters.

According to the standard, the O-QPSK PHY is required to have EVM values less than 35% when measured over 1000 chips. In exemplary aspects, it is recognized that frequency shaping filter 204 can be implemented using a family of truncated raised-cosine filters in order to satisfy the above spectral mask requirements and also display very low EVM characteristics. Referring to FIG. 4A, a square raised cosine filter 402 with a roll off factor of 0 (i.e., a sinc filter) is shown for one implementation of frequency shaping filter 204. In FIG. 4A, it is seen that although the spectral side-lobes get suppressed, at the same time EVM goes up as the impulse response main lobe is stretched to span a time duration longer than 1 chip period. Thus, the effect of the rising EVM needs to be combated.

Figure 4B:
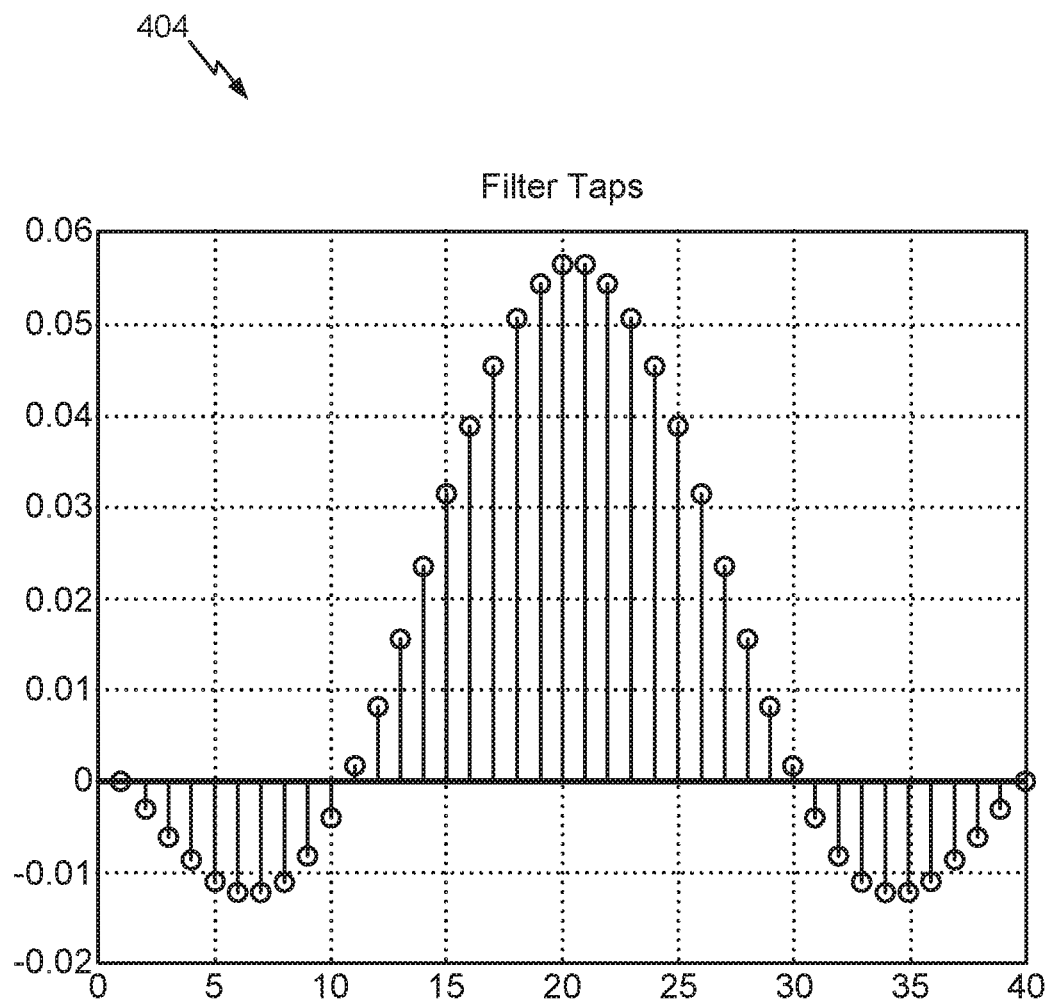
Figure 4C:
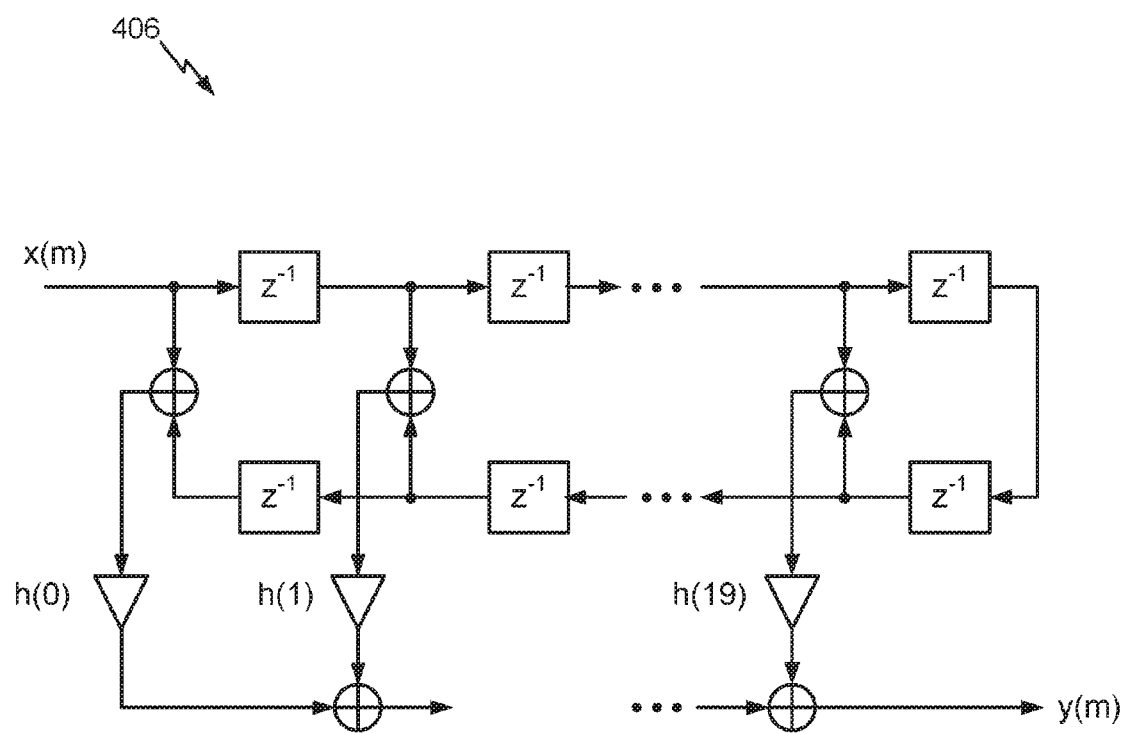

For an efficient implementation of filter 402 in FIG. 4A, an N-tap even-symmetric filter with z-domain transfer function is provided as follows $H(z)=h(0)+h(1)z^{-1}+\ldots+h(N-1)z^{-(N-1)}$ For a direct-form implementation of filter 402, the characteristic of H(z) having an even symmetry is exploited, wherein, by re-arranging the coefficients of H(z) in the above equation, the following representation of H(z) is obtained:

$H(z)=h(0)(1+z^{-(N-1)})+h(1)(z^{-1}+z^{-(N-2)})+\ldots+h(N/2-1)(z^{-N/2-1}z^{-N/2})$ Considering the case of filter 402 implemented as a 3-chip-long truncated sinc shaping filter, and assuming that the transmission chip rate is 2 MHz and transmission sample rate is 26 MHz, the 2 MHz chips need to be repeated 13 times and the filter will have 3×13=39 taps. To make the filter even-symmetric, one more tap is added, to obtain N=40 taps. FIG. 4B is a plot 404 of all the filter taps. It is noted that only 20 of the tap values need to be stored. Also, since samples of the input signal 201 are either +1 or −1 in FIG. 2, there is no need for actual multiplication. A structural implementation 406 of filter 402 is shown in FIG. 4C.

Another implementation of frequency shaping filter 204 can be a polyphase structure. For a polyphase structure, a sample repetition within a chip can be performed as explained above, keeping in mind that sample repetition within a chip is equivalent to up-sampling (zero padding) followed by convolution with a square pulse that has a duration of the chip. Thus, when the square pulse is convoluted with the truncated sinc filter, as shown in plot 408 of FIG. 4D, because of the convolution, plot 408 is one chip duration longer, i.e., there are 13 more taps (total of 52 taps).

Figure 4D:
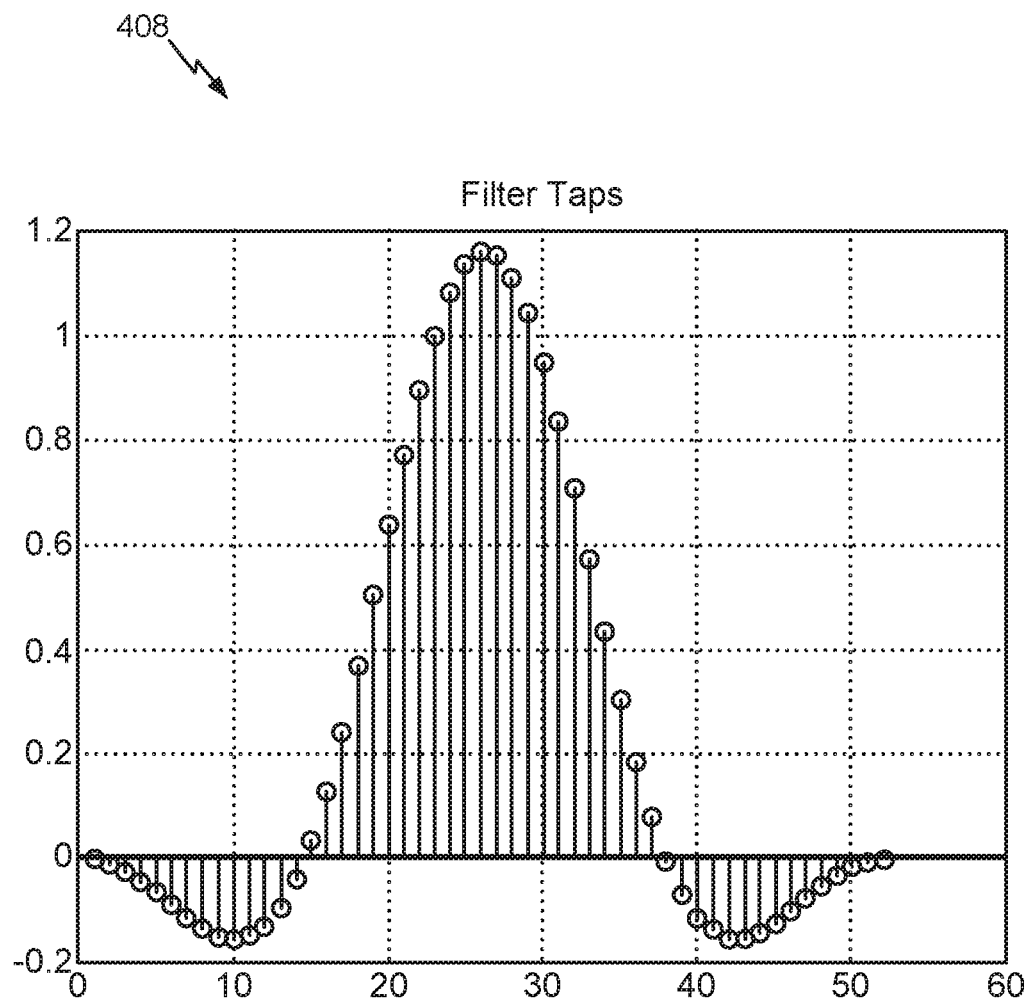
Figure 4E:
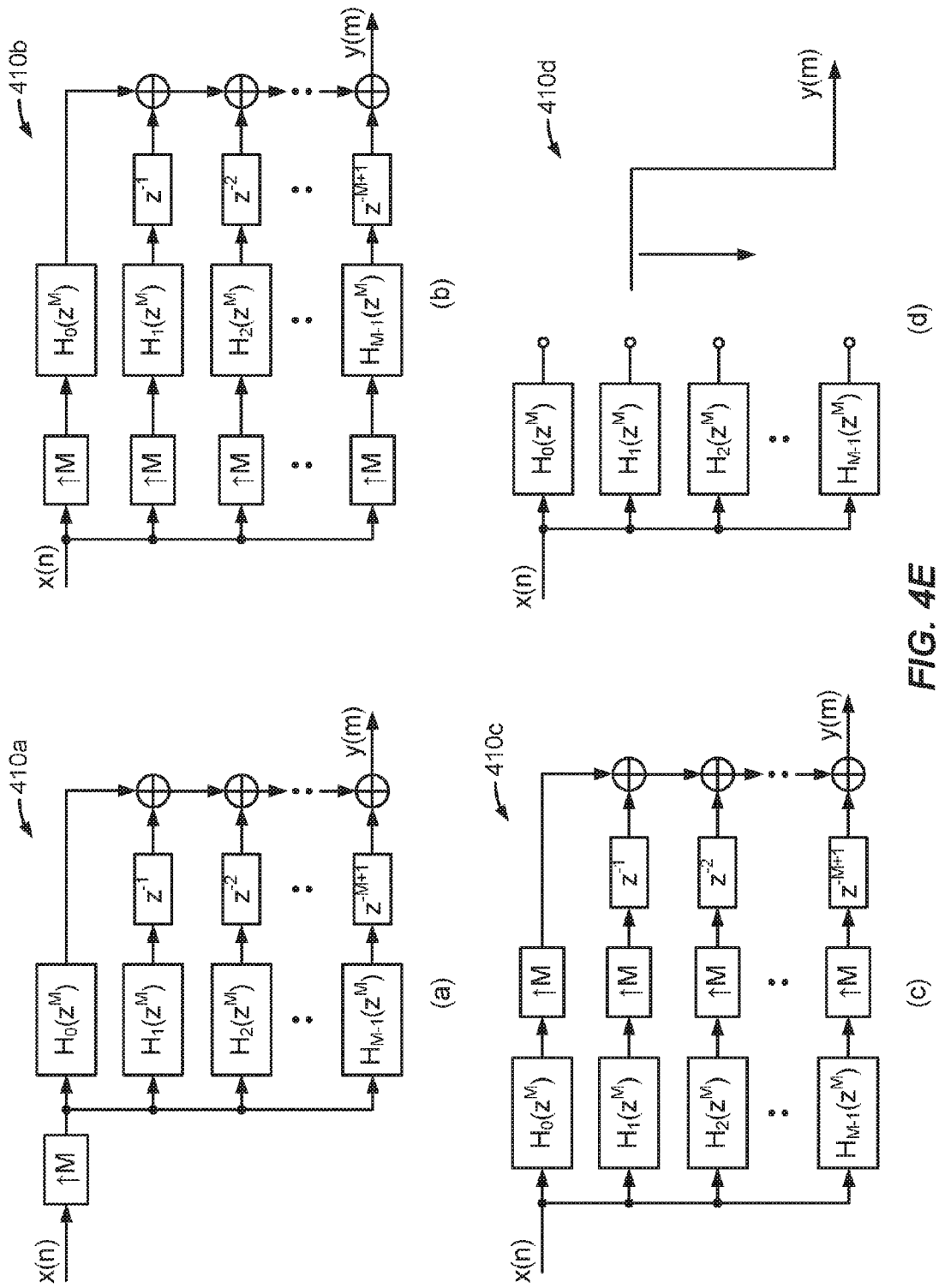

Referring to plot 408 of FIG. 4D, the frequency shaping to be implemented in frequency shaping filter 204 may be recast into up-sampling of mapped signal 203 followed by interpolation. Therefore, a polyphase filter 410 as shown in FIG. 4E, using interpolating filters where the entire filter can be run at the input chip rate, i.e., 2 MHz, instead of the output sample rate, i.e., 26 MHz may be used. In this regard, an N tap even-symmetric filter with the below transfer function is used as a starting point:

$$H(z) = \frac{Y(Z)}{X(Z)} = h(0) + h(1)z^{-1} + \ldots + h(N-1)z^{-N+1}$$

Wherein, it is assumed that N=LM where M is the interpolation factor, i.e., $$M = \frac{26 \text{ MHz}}{2 \text{ MHz}} - 13.$$

Since N=52 is the total number of taps in the interpolation filter, L becomes 4.

The above transfer function can be recast in the following manner:

$$H(z) = H_0(z^M) + z^{-1} H_1(z^M) + z^{-(M-1)} H_{M-1}(z^M) + \ldots$$

where, $$H_0(z^M) = h(0) + h(M)z^{-M} + \ldots + h((L-1)M)z^{-(L-1)M}$$

$$H_1(z^M) = h(1) + h(M+1)z^{-M} + \ldots + h((L-1)M+1)z^{-(L-1)M}$$

$$\vdots \qquad \vdots$$

$$H_{M-1}(z^M) = h(M-1) + h(2M-1)z^{-M} + \ldots + h(LM-1)z^{-(L-1)M},$$

FIG. 4E shows the recast transfer function implemented using the structure of polyphase filter 410a. Polyphase filter 410a is equivalently modified to the structure of polyphase filter 410b, and using Noble identity, to polyphase filter 410c, to eventually reach the structure of polyphase filter 410d. Although any polyphase filter implementation can be used for frequency shaping filter 204 of FIG. 2, polyphase filter 410d may be used in exemplary aspects. Polyphase filter 410d is seen to effectively reduce power consumption (side-lobe suppression) to meet the PSD, and also keeps EVM from increasing, which allows EVM requirements to be met.

Returning now to FIG. 2, regardless of the specific implementation chosen for frequency shaping filter 204, frequency shaped output 205 of frequency shaping filter 204 may be quantized, e.g., represented as an N-bit wide signal based on the sample rate applied. The quantized frequency shaped output 205 is fed to adaptive rounding block 206. Adaptive rounding block 206 is configured to apply an adaptive rounding algorithm designed to prevent phase drift and curb EVM growth due to the aforementioned quantization effect. The adaptive rounding algorithm and exemplary implementations of adaptive rounding block 206 will now be explained.

An aspect of adaptive rounding block 206 is directed to reducing the bit width of the digital signal 207 (e.g., from N-bits to N-M bits as shown in FIG. 2) which is provided to frequency synthesizer 208, as this would reduce the area, power consumption and design complexity of frequency synthesizer 208. However, reducing the bit width can lead to a bigger quantization error and EVM growth. Even if large bit widths are allowed for internal signals of transmitter 200, the output of transmitter 200, which is an instantaneous modulation frequency, may need to be quantized before it is fed to the frequency synthesizer. However, it is also observed that in the case of a transmitter designed according to the aforementioned IEEE 802.15.4 standard, that a majority of the filter coefficient sets for frequency shaping filter 204 are seen to display a skewed quantization error distribution. In other words, quantization errors tend to be mostly positive or mostly negative.

Figure 5A:
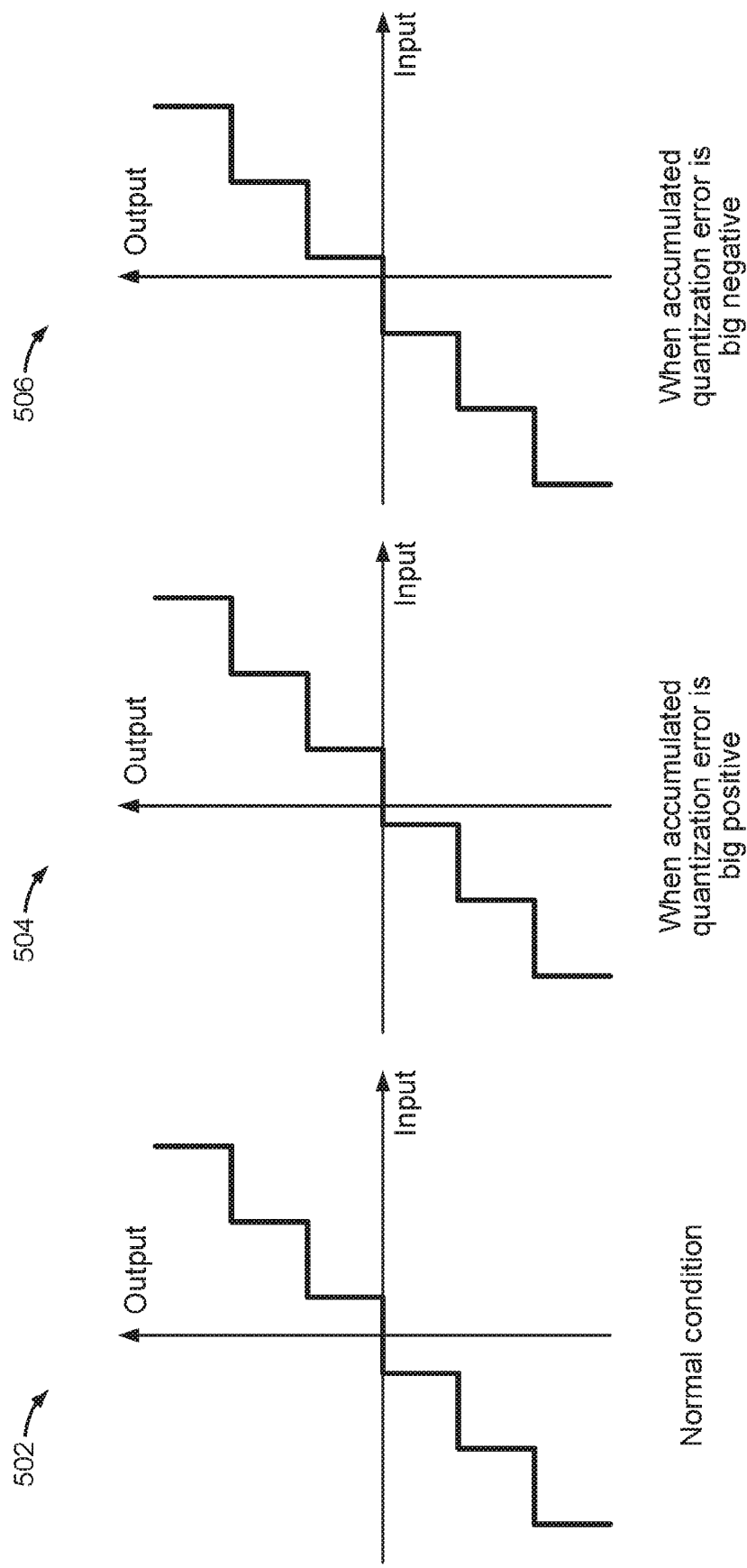
FIG. 5A illustrates input-output plots to show accumulated quantization.

Referring to FIG. 5A, output vs input waveforms 502, 504, and 506 showing quantization error are illustrated. Waveform 502 refers to a normal condition where there is no accumulated quantization error and the reduced bit width output 207 (e.g., N-M bits) of adaptive rounding block 206 follows its input 207 (e.g., N-bits) in a staircase function. However, if there is a positive quantization error, waveform 504 illustrates the output drifting away in the positive direction from the input, while if there is a negative quantization error, waveform 506 illustrates the output drifting away in the negative direction from the input. This means that an accumulated quantization error (waveforms 504/506) for the instantaneous modulation frequency would cause the phase of output 209 of frequency synthesizer 208 to drift in an unchecked manner, which can in turn cause the EVM to deteriorate.

To prevent the phase of the output from drifting, the adaptive rounding algorithm is designed to monitor the accumulated quantization error and adapt a quantization threshold such that future quantization error occurs in the desired direction (the opposite direction of the accumulated quantization error at a given instant) more easily.

Figure 5B:
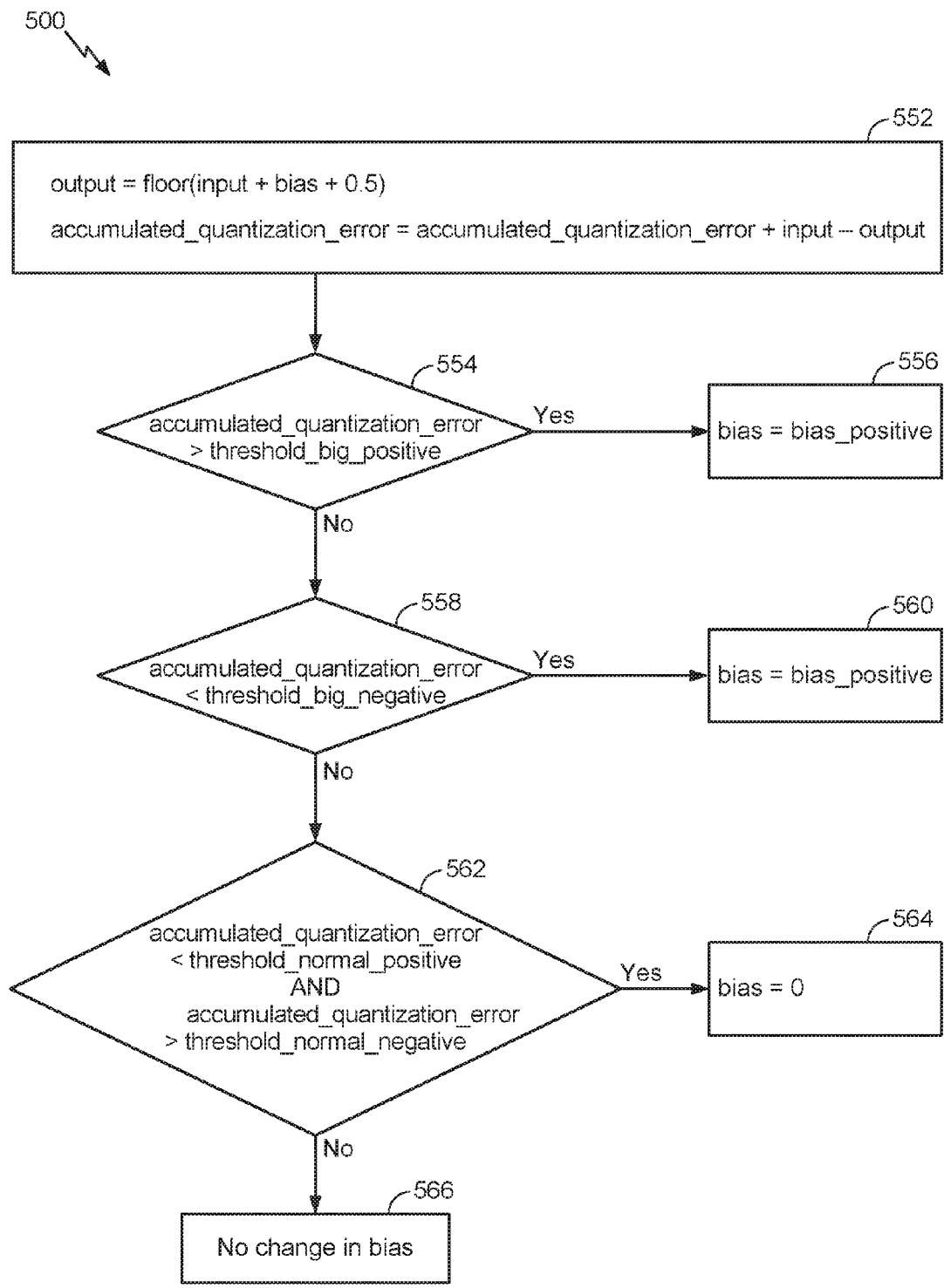
FIG. 5B illustrates a flow-chart of an adaptive rounding algorithm for reducing quantization error according to aspects of this disclosure.

With reference to FIG. 5B, a flow-chart 550 pertaining to an example adaptive rounding algorithm according to this disclosure will be explained. In FIG. 5B, floor(.) is an operator which returns the largest integer no greater than the argument, wherein output=floor(input+bias+0.5).

In block 552, accumulated quantization error is initialized as accumulated_quantization_error=accumulated_quantization_error+input−output In decision block 554, if
   (accumulated_quantization_error>threshold_big_positive)

then in block 556 the bias is changed in the positive direction:

bias=bias_positive

Otherwise, the flow proceeds to decision block 558, wherein if
   (accumulated_quantization_error<threshold_big_negative)

then in block 560 the bias is changed in the negative direction:

bias=bias_negative

Otherwise, the flow proceeds to decision block 562, wherein if
   (accumulated_quantization_error<threshold_normal_positive
   AND
   accumulated_quantization_error>threshold_normal_negative)

then in block 564 the bias is set to zero:

bias=0

Otherwise, flow-chart 550 ends in block 566, where there is no change in the bias.

As seen from flow-chart 550 of FIG. 5B, by adaptively changing the bias depending on how the accumulated quantization error compares to a set of thresholds: (e.g., big positive threshold, big negative threshold, normal positive threshold, and normal negative threshold in the above pseudo-code), the phase error is prevented from drifting. The above flow-chart 550 or equivalent pseudo-code may be implemented by any suitable hardware or combination of hardware/software in adaptive rounding block 206. For example, the adaptive rounding block can include a rounding block configured to generate a quantized value based on the input sample value and a bias, a logic block configured to compute the accumulated quantization error, and a logic block configured to determine a rounding bias based on the current computed quantization error and a previous accumulated quantization error. As such, a hardware implementation of adaptive rounding block 206 would not incur significant area, or power but can enables a significant area and power savings in transmitter 200 by reducing the bit width of the input 207 to frequency synthesizer 208 (i.e., the output of adaptive rounding block 206 which can be reduced to a sample rate of N-M bits). In this manner, frequency synthesizer 208 can be designed with smaller number of input bits while meeting EVM requirements.

It is observed that if more simplistic approaches were relied on rather than the exemplary adaptive rounding algorithm, such as adding or subtracting a fixed value when the accumulated quantization error becomes significant in an effort to reduce the drift, such abrupt correction techniques may cause side-lobe power spectral density to rise, which is undesirable. In contrast, the adaptive rounding algorithm is designed to apply a more smooth reduction in the accumulated quantization error, thus allowing for better side-lobe suppression while meeting EVM requirements.

Figure 6:
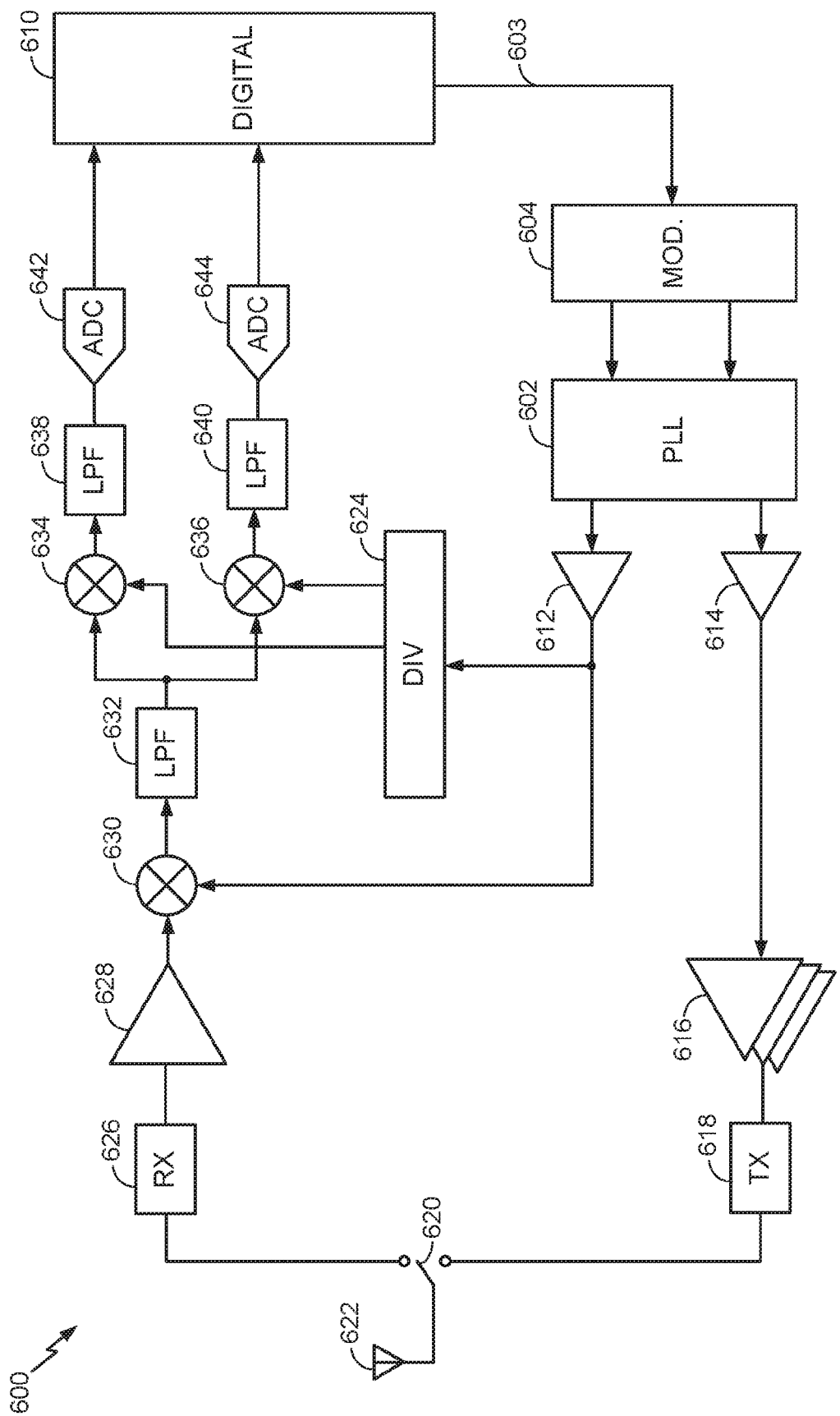
FIG. 6 illustrates an example wireless transceiver with transmitter side processing, according to aspects of the disclosure.

FIG. 6 illustrates an example wireless transceiver 600 according to aspects of the disclosure. The illustrated example of wireless transceiver 600 includes PLL 602, modulator 604, digital controller 610, buffers 612 and 614, transmit amplifiers 616, transmit matching network 618, transmit/receive switch 620, antenna 622, divider 624, receive matching network 626, front end amplifier 628, mixer 630, low pass filter 632, mixers 634 and 636, low pass filters 638 and 640, and analog-to-digital converters (ADCs) 642 and 644. Wireless transceiver 600 is illustrated as having distinct transmit and receive processing paths. Exemplary aspects of this disclosure may be applicable to the transmit processing path, as discussed in the above sections.

Figure 7:
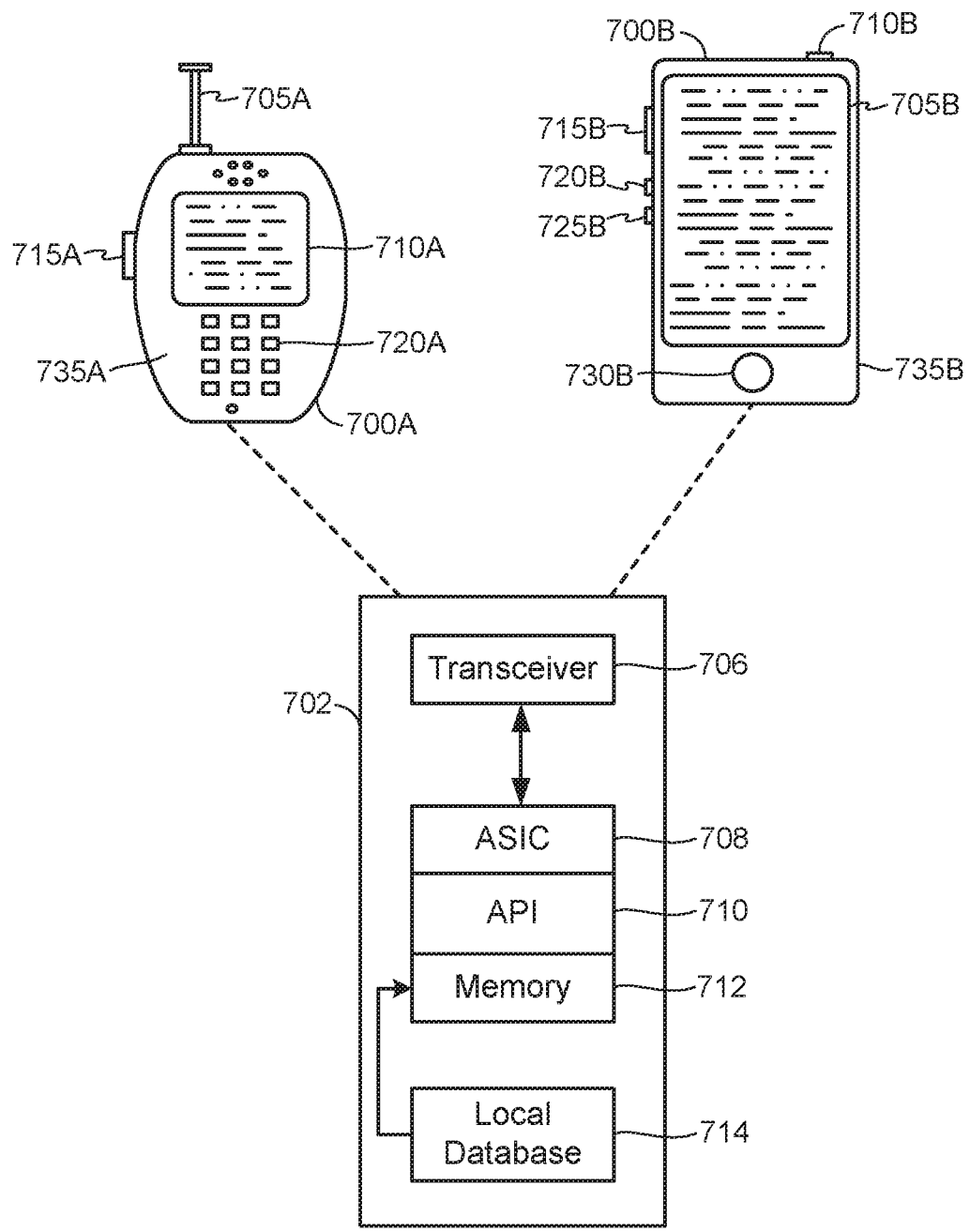
FIG. 7 illustrates example wireless devices, according to aspects of the disclosure.

With reference now to FIG. 7, example wireless devices 700A and 700B, according to aspects of the disclosure are illustrated. In some examples, wireless devices 700A and 700B may herein be referred to as wireless mobile stations. The example wireless device 700A is illustrated in FIG. 7 as a calling telephone and wireless device 700B is illustrated as a touchscreen device (e.g., a smart phone, a tablet computer, etc.). As shown in FIG. 7, an exterior housing 735A of wireless device 700A is configured with antenna 705A, display 710A, at least one button 715A (e.g., a PTT button, a power button, a volume control button, etc.) and keypad 720A among other components, not shown in FIG. 7 for clarity. An exterior housing 735B of wireless device 700B is configured with touchscreen display 705B, peripheral buttons 710B, 715B, 720B and 725B (e.g., a power control button, a volume or vibrate control button, an airplane mode toggle button, etc.), at least one front-panel button 730B (e.g., a Home button, etc.), among other components, not shown in FIG. 7 for clarity. For example, while not shown explicitly as part of wireless device 700B, wireless device 700B may include one or more external antennas and/or one or more integrated antennas that are built into the exterior housing 735B of wireless device 700B, including but not limited to WiFi antennas, cellular antennas, satellite position system (SPS) antennas (e.g., global positioning system (GPS) antennas), and so on.

While internal components of wireless devices such as the wireless devices 700A and 700B can be embodied with different hardware configurations, a basic high-level configuration for internal hardware components is shown as platform 702 in FIG. 7. Platform 702 can receive and execute software applications, data and/or commands transmitted from a radio access network (RAN) that may ultimately come from a core network, the Internet and/or other remote servers and networks (e.g., an application server, web URLs, etc.). Platform 702 can also independently execute locally stored applications without RAN interaction. Platform 702 can include a transceiver 706 operably coupled to an application specific integrated circuit (ASIC) 708, or other processor, microprocessor, logic circuit, or other data processing device. ASIC 708 or other processor executes an application programming interface (API) 710 layer that interfaces with any resident programs in a memory 712 of the electronic device. Memory 712 can be comprised of read-only or random-access memory (RAM and ROM), EEPROM, flash cards, or any memory common to computer platforms. Platform 702 also can include a local database 714 that can store applications not actively used in memory 712, as well as other data. Local database 714 is typically a flash memory cell, but can be any secondary storage device as known in the art, such as magnetic media, EEPROM, optical media, tape, soft or hard disk, or the like.

In one aspect, wireless communications by wireless devices 700A and 700B may be enabled by the transceiver 706 based on different technologies, such as CDMA, W-CDMA, time division multiple access (TDMA), frequency division multiple access (FDMA), Orthogonal Frequency Division Multiplexing (OFDM), GSM, 2G, 3G, 4G, LTE, or other protocols that may be used in a wireless communications network or a data communications network. Voice transmission and/or data can be transmitted to the electronic devices from a RAN using a variety of networks and configurations. Accordingly, the illustrations provided herein are not intended to limit the aspects of the invention and are merely to aid in the description of aspects of aspects of the invention.

Accordingly, aspects of the present disclosure can include a wireless device (e.g., wireless devices 700A, 700B, etc.) configured, and including the ability to perform the functions as described herein. For example, transceiver 706 may be implemented as wireless transceiver 600 of FIG. 6, including the transmit processing path. As will be appreciated by those skilled in the art, the various logic elements can be embodied in discrete elements, software modules executed on a processor or any combination of software and hardware to achieve the functionality disclosed herein. For example, ASIC 708, memory 712, API 710 and local database 714 may all be used cooperatively to load, store and execute the various functions disclosed herein and thus the logic to perform these functions may be distributed over various elements. Alternatively, the functionality could be incorporated into one discrete component. Therefore, the features of the wireless devices 700A and 700B in FIG. 7 are to be considered merely illustrative and the invention is not limited to the illustrated features or arrangement.

Figure 8:
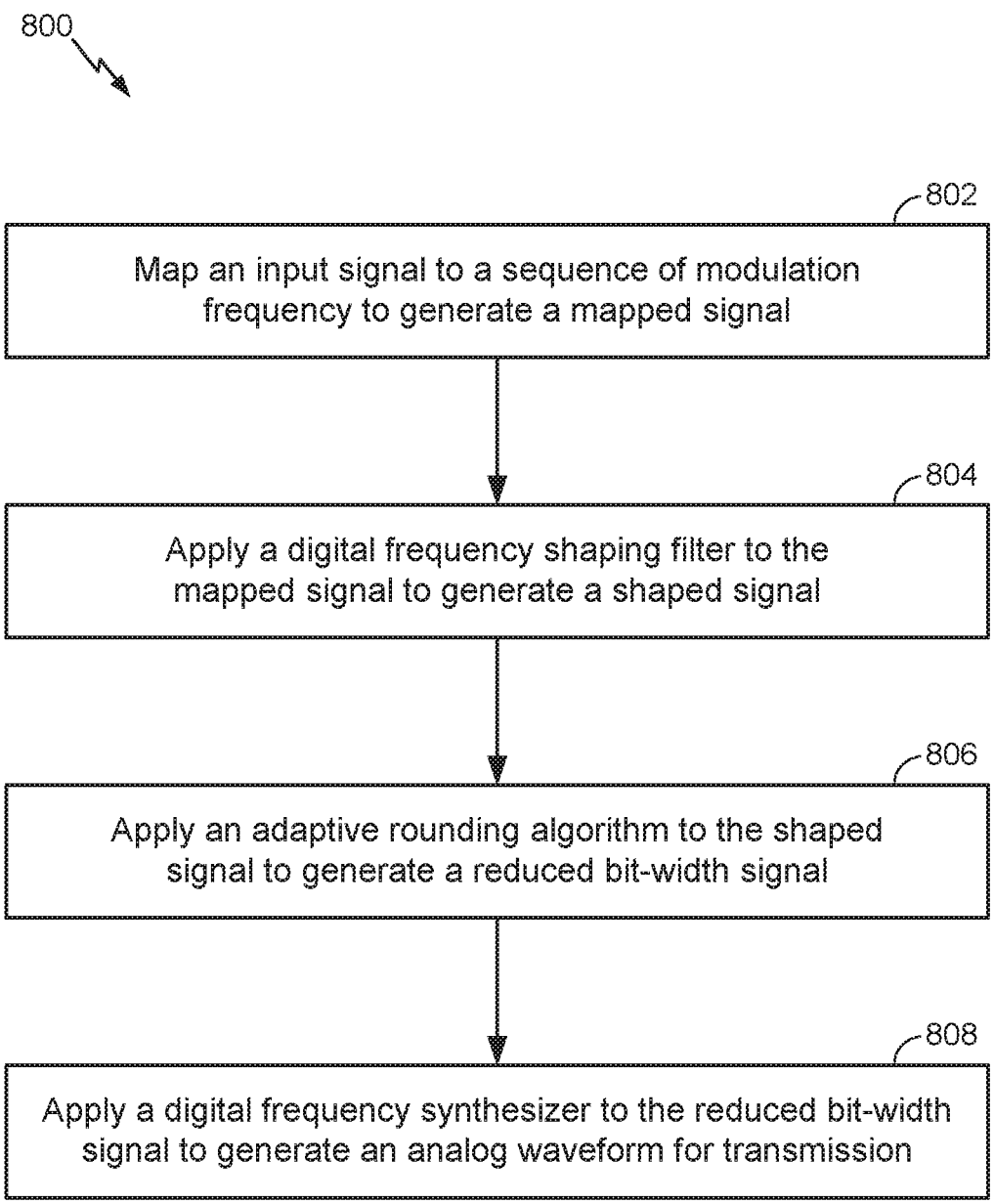
FIG. 8 illustrates an example method for phase modulation of polar coordinates in a transmitter of wireless signals, according to aspects of the disclosure.

It will be appreciated that aspects include various methods for performing the processes, functions and/or algorithms disclosed herein. For example, FIG. 8 illustrates an example method 800 for generating phase modulated signals in polar coordinates, in a transmitter (e.g., 200) of wireless signals.

In block 802, method 800 comprises mapping an input signal (e.g., 201) to a sequence of modulation frequency (e.g., in block 202) to generate a mapped signal (e.g., 203).

In block 804, method 800 comprises applying a digital frequency shaping filter (e.g., frequency shaping filter 204) to the mapped signal to generate a shaped signal (e.g., 205 of N bits).

In block 806, method 800 comprises applying an adaptive rounding algorithm (e.g., in adaptive rounding block 206) to the shaped signal to generate a reduced bit-width signal (e.g., 207), e.g., which satisfies EVM requirements.

In block 806, method 800 comprises applying a digital frequency synthesizer (e.g., frequency synthesizer 208) to the reduced bit-width signal to generate an analog waveform (e.g., 209, O-QPSK waveform) for transmission, wherein the analog waveform, e.g., which satisfies a specified spectral mask, Further, those of skill in the art will appreciate that the various illustrative logical blocks, modules, circuits, and algorithm steps described in connection with the aspects disclosed herein may be implemented as electronic hardware or a combination of computer software and electronic hardware. To clearly illustrate this interchangeability of hardware and hardware-software combinations, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a non-transitory computer-readable media embodying a method for phase modulation of polar coordinates in a transmitter of wireless signals. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method for generating phase modulated signals in polar coordinates for transmission in a transmitter of wireless signals, the method comprising:
   mapping an input signal to a sequence at modulation frequency to generate a mapped signal;
   applying a digital frequency shaping filter to the mapped signal to generate a shaped signal;
   applying an adaptive rounding algorithm to the shaped signal to generate a reduced bit-width signal, wherein applying the adaptive rounding algorithm comprises:
      generating a quantized value from the shaped signal and a bias;
      computing an accumulated quantization error; and
      determining a rounding bias based on the computed accumulated quantization error and a previous accumulated quantization error; and
   applying a digital frequency synthesizer to the reduced bit-width signal to generate an analog waveform for transmission.

2. The method of claim 1, wherein the mapping comprises minimum-shift keying (MSK) or offset-quadrature phase shift keying (O-QPSK) mapping.

3. The method of claim 1, wherein applying the digital frequency shaping filter comprises reducing side-lobes in frequency of the analog waveform for transmission.

4. The method of claim 1, wherein the digital frequency shaping filter is a polyphase filter.

5. The method of claim 1, wherein the analog waveform for transmission meets error vector magnitude (EVM) spectral mask requirements according to IEEE 802.15.4 standards at high transmit power levels.

6. A transmitter of wireless signals, comprising:
   a mapping block configured to map an input signal in polar coordinates to a sequence at modulation frequency to generate a mapped signal;
   a digital frequency shaping filter configured to shape the frequency of the mapped signal to generate a shaped signal;
   an adaptive rounding block configured to perform adaptive rounding of the shaped signal to generate a reduced bit-width signal, wherein the adaptive rounding block is configured to:
      generate a quantized value from the shaped signal and a bias;
      compute an accumulated quantization error; and
      determine a rounding bias based on the computed accumulated quantization error and a previous accumulated quantization error; and
   a digital frequency synthesizer configured to generate an analog waveform for transmission from the reduced bit-width signal.

7. The transmitter of claim 6, wherein the mapping block is configured to map the input signal based on minimum-shift keying (MSK) or offset-quadrature phase shift keying (O-QPSK).

8. The transmitter of claim 6, wherein the digital frequency shaping filter is configured to reduce side-lobes in frequency of the analog waveform for transmission.

9. The transmitter of claim 6, wherein the digital frequency shaping filter is a polyphase filter.

10. The transmitter of claim 6, wherein the analog waveform for transmission is configured to meet error vector magnitude (EVM) spectral mask requirements according to IEEE 802.15.4 standards at high transmit power levels.

11. An apparatus configured for transmission of wireless signals, the apparatus comprising:
   means for mapping an input signal in polar coordinates to a sequence at modulation frequency to generate a mapped signal;
   means for digital shaping the frequency of the mapped signal to generate a shaped signal;
   means for adaptively rounding the shaped signal to generate a reduced bit-width signal comprising
      means for generating a quantized value from the shaped signal and a bias;
      means for computing an accumulated quantization error; and
      means for determining a rounding bias based on the computed accumulated quantization error and a previous accumulated quantization error; and
   means for generating an analog waveform for transmission from the reduced bit-width signal.

12. The apparatus of claim 11, comprising means for mapping the input signal based on minimum-shift keying (MSK) or offset-quadrature phase shift keying (O-QPSK).

13. The apparatus of claim 11, comprising means for reducing side-lobes in analog waveform for transmission.

14. The apparatus of claim 11, wherein the analog waveform for transmission meets error vector magnitude (EVM) spectral mask requirements according to IEEE 802.15.4 standards at high transmit power levels.

15. A non-transitory computer readable storage medium comprising code, which, when executed by a processor, causes the processor to perform operations for generating phase modulated signals in polar coordinates for transmission of wireless signals, the non-transitory computer readable storage medium comprising:
   code for mapping an input signal to a sequence at modulation frequency to generate a mapped signal;
   code for applying a digital frequency shaping filter to the mapped signal to generate a shaped signal;
   code for applying an adaptive rounding algorithm to the shaped signal to generate a reduced bit-width signal, comprising:
      code for generating a quantized value from the shaped signal and a bias;
      code for computing an accumulated quantization error; and
      code for determining a rounding bias based on the computed accumulated quantization error and a previous accumulated quantization error; and
   code for applying a digital frequency synthesizer to the reduced bit-width signal to generate an analog waveform for transmission.

16. The non-transitory computer readable storage medium of claim 15, wherein the mapping comprises minimum-shift keying (MSK) or offset-quadrature phase shift keying (O-QPSK) mapping.

17. The non-transitory computer readable storage medium of claim 15, comprising code for reducing side-lobes in frequency of the analog waveform for transmission.

18. The non-transitory computer readable storage medium of claim 15, wherein the analog waveform for transmission meets error vector magnitude (EVM) spectral mask requirements according to IEEE 802.15.4 standards at high transmit power levels.

* * * * *